United States Patent
Edlinger

(10) Patent No.: US 6,332,910 B1
(45) Date of Patent: Dec. 25, 2001

(54) PROCESS FOR WORKING UP STEEL SLAGS AND IRON CARRIERS FOR OBTAINING PIG IRON AND ENVIRONMENTALLY SAFE SLAGS

(75) Inventor: Alfred Edlinger, Baden (CH)

(73) Assignee: Holderbank Financiere Glarus AG (CH)

( * ) Notice: Subject to any disclaimer, the term of this patent is extended or adjusted under 35 U.S.C. 154(b) by 0 days.

(21) Appl. No.: 09/308,139
(22) PCT Filed: Sep. 8, 1998
(86) PCT No.: PCT/AT98/00210
  § 371 Date: May 14, 1999
  § 102(e) Date: May 14, 1999
(87) PCT Pub. No.: WO99/14381
  PCT Pub. Date: Mar. 25, 1999

(30) Foreign Application Priority Data

Sep. 15, 1997 (AT) .................................... 1546/97
Mar. 5, 1998 (AT) .................................. 131/98 U

(51) Int. Cl.⁷ .................................................. C21B 11/00
(52) U.S. Cl. ............................................... 75/453; 75/502
(58) Field of Search ........................................ 75/502, 453

(56) References Cited

U.S. PATENT DOCUMENTS 4,725,307  2/1988  Harada .
5,556,457  9/1996  Terza et al. .
5,662,860 * 9/1997  Klaassen et al. ...................... 75/453
5,891,214 * 4/1999  Innes et al. ............................ 75/502

FOREIGN PATENT DOCUMENTS 26 48 220   8/1977  (DE) .
0 313 547   4/1989  (EP) .
95/07365    3/1995  (WO) .

* cited by examiner

Primary Examiner—Melvyn Andrews
(74) Attorney, Agent, or Firm—Pillsbury Winthrop LLP

(57) ABSTRACT

In a process for working up steel slags and iron carriers such as, e.g., electric furnace slags, converter slags, fine ores, dusts from steel production, mill scales for obtaining pig iron and environmentally safe slags, the volume ratio of molten slag to iron bath is chosen to be larger than 0.5 to 1 and, preferably, 0.8:1 to 1.5:1 and the slags are supplemented with $SiO_2$ carriers such as, e.g., foundry sands, metallurgical sands and/or fine ores so as to adjust a slag basicity ($CaO/SiO_2$) of between 1.0 and 1.8 and, preferably, 1.2 and 1.8 at an $Al_2O_3$ content of between 10 and 25% by weight, based on the slag. In doing so, hot blast is top-blown and coal, optionally along with an inert gas and, in particular, nitrogen and, furthermore, optionally oxygen or hot air is blown through the iron bath.

17 Claims, 2 Drawing Sheets

PROCESS FOR WORKING UP STEEL SLAGS AND IRON CARRIERS FOR OBTAINING PIG IRON AND ENVIRONMENTALLY SAFE SLAGS

This application is the national phase of internationl application PCT/AT98/00210 filed Sep. 8, 1998 which designated the U.S.

BACKGROUND OF THE INVENTION

1. Filed of the Invention

The invention relates to a process for working up steel slags and iron carriers such as, e.g., electric furnace slags, converter slags, fine ores, dusts from steel production, mill scales for obtaining pig iron and environmentally safe slags.

2. Prior Art

From PCT/AT 96/00019 a process for producing pig iron or steel and cement clinker from slags has become known, in which iron-oxide-containing liquid slags such as, for instance, steel works slag were mixed with iron oxide carriers and lime, whereupon a ferrite slag was formed. After this, that ferrite slag was reduced in a reduction reactor under the formation of an iron bath and a sinter phase while burning carbon, whereupon the sinter phase was discharged as a clinker.

Slags have a relatively poor thermal conductivity and a thermal capacity approximately 1.5 to 2 times higher than that of iron. What is essential to the economy of a process of this kind is the heat transfer to be attained or what is called degree of afterburning. The degree of afterburning is defined as follows:

$$\text{Degree of afterburning} = \frac{CO_2 + H_2O}{CO + CO_2 + H_2 + H_2O} \text{ gaseous phase}$$

By the known modes of procedure, only an insufficient degree of afterburning has been ensured so far. Nor do the known modes of procedure offer a $$\text{Heat transfer} = 1 - \frac{H_g - H_b}{H_{pc}}$$

$H_g$ ... Enthalpy of gas (at gas temperature)
$H_b$ ... Enthalpy of gas (at melting temperature)
$H_{pc}$ ... Combustion enthalpy (at melting temperature)

that is sufficient for an economic mode of procedure.

Thermal efficiencies of far above 70% are attained neither in conventional blast furnace technologies nor in other processes such as, for instance, fluidized bed processes. Thus, it has already been known to blow prereduced and at least partially preheated charges into a fluidized bed along with coal, wherein coal is gasified in a fluidized bed under reduction of the charge and sponge iron is. melted and drawn off. To make things worse, such meltdown gasification reactions, as a rule, are optimized with a view to the pig iron output sought so that no environmentally safe slag is formed.

The present invention aims at providing a process of the initially defined kind, by which the thermal yield and hence the efficiency are substantially enhanced as compared to known processes. To solve this object, the process according to the invention essentially consists in that the volume ratio of molten slag to iron bath is chosen to be larger than 0.5 to 1 and, preferably, 0.8:1 to 1.5:1 and that the slags are supplemented with $SiO_2$ carriers such as, e.g., foundry sands, metallurgical sands and/or fine ores so as to adjust a slag basicity ($CaO/SiO_2$) of between 1.0 and 1.8 and, preferably, 1.2 and 1.8 at an $Al_2O_3$ content of between 10 and 25% by weight, based on the slag, wherein hot blast is top-blown and coal, optionally along with an inert gas and, in particular, nitrogen and, furthermore, optionally oxygen or hot air is blown through the iron bath. By using an extremely high specific amount of slag, which is substantially elevated as compared to known processes, the slag is able to assume the function of a heat transfer medium from the gas space to the slag iron melt mixture. The thermal capacity of the slag, which is 1.5 to 2 time higher than that of iron, allows for a high heat transfer, thereby avoiding the blowing through of coals and hence too small an exchange surface between the reductant carrier iron bath and the oxide carrier slag due to an accordingly high iron bath portion. By adding $SiO_2$ carriers to the slags for adjusting a defined slag basicity of from 1 to 1.8 and, in a particularly preferred manner, between 1.3 and 1.6 as provided by the invention, it is feasible to directly produce environmentally safe slags, wherein the direct usability of such environmentally safe slags may be enhanced even further by adjusting the $Al_2O_3$ content to values of between 10 and 25% by weight, based on the slag.

By top-blowing hot blast or hot air, the heat transfer is additionally increased, the top-blowing of hot blast in combination with the blowing in of coal and N2 and, separately, oxygen into the iron bath enabling the intensive thorough mixing of the slag with the iron bath and hence an elevated heat transmission in the slag and iron bath suspension formed by thorough mixing.

In order to definitely prevent the risk of blow-throughs, it is advantageously proceeded in a manner that the melt bath height corresponds to at least 20 times and, preferably, 30 to 60 times the diameter of the submerged tuyeres. This is, at the same time, beneficial to appropriate fluidization as well as the formation of a slag and iron bath suspension, thus enhancing heat transmission in the liquid phase.

Heat transfer may be further improved by the impact pulse of the hot blast jet, such an impact pulse further improving the intensive thorough mixing of the slag bath with the iron bath. Advantageously, it is proceeded in a manner that the speed of the hot blast is chosen between 0.4 and 0.8 Mach.

An environmentally safe slag product capable of being utilized in a particular suitable manner may be produced within the scope of the process according to the invention in that the slags are granulated forming a glass content of more than 90% and, preferably, more than 93%.

In addition to the selection of the optimum hot blast speed, heat transfer may still be enhanced by increasing the specific bath surface. Such an increase in the specific bath surface may, for instance, be effected by droplets flying into the gas space of the converter using high-pressure submerged tuyeres, thereby being able to obtain an increase in the bath surface by a factor 20 as compared to a calm slag melt. And his is exactly what is reached by dimensioning the height of the melt bath relative to the diameter of the submerged tuyeres.

Unlike usual blast furnace processes and conventional steel or pig iron production processes, which aim for specific slag amounts as small as possible, the process according to the invention in a particularly advantageous manner renders feasible the conversion of a number of hitherto hardly usable iron carriers to pig iron in an energetically particularly favourable and hence economic manner. To a high degree, this applies to fine ores, which have been difficult to work up in an economic manner so far. Also dusts from steel production, which have relatively high heavy metal contents in addition to high iron contents, may be readily utilized within the scope of the process according to the invention. Naturally, this applies also to mill scales, the conventional utilization of which partially involves greater problems due to adhering oils, which do not constitute any difficulties within the scope of the process according to the invention. (Addition through central tube of hot blast lance).

The process according to the invention in the first place is of particularly great interest to electric steel works, the latter using no pig iron technology and, in particular, no blast furnace technology. Electric steel works, as a rule, must buy pig iron at relatively high prices if higher-quality products are to be produced. This holds, in particular, if the contents of copper and tin dragged into an electric furnace through scrap steel are to be reduced by dilution. Besides the favourable utilization and disposal of metallurgical residual substances such as electric furnace slag and dusts, scales as well as optionally foundry sand, also aluminium (oxide) containing grinding dusts as well as dried red muds occurring in the recovery of bauxite by the Bayer process and other sources of residual substances difficult to dispose of may be used within the scope of the process according to the invention in a particularly advantageous manner.

Advantageously, the process according to the invention is carried out in a manner that coal in an amount of 60 to 350 kg/t slag along with 6 to 9 $Nm^3/t$ slag nitrogen as a carrier gas as well as 25 to 100 $Nm^3/t$ slag oxygen, optionally together with hydrocarbons for protecting the tuyeres, are passed through the bath, thus rendering the economoy particularly attractive.

In order to obtain as intensive a thorough mixing of the slag and iron bath as possible, for instance, in the form of a slag and iron bath suspension, the process according to the invention advantageously is realized in a manner that the gases are fed under a pressure of 5 to 10 bars with $N_2$ being used at a higher pressure, in particular 7 to 10 bars, than $O_2$ and hydrocarbons such as, e.g., natural gas. A particularly high energy yield using hot blast is feasible if hot blast is top-blown through lances under a pressure of 0.8 to 1.2 bars in amounts of 400 to 1200 $Nm^3/t$ slag.

Advantageously, the process is carried out in a manner that the converter offgas temperature is controlled at 1600 to 1800° C and, preferably, 1650 to 1750° C.

The process according to the invention allows for the production of environmentally compatible slags and, in particular, those having CaO to $SiO_2$ ratios of from 1.3 to 1.6 and $Al_2O_3$ contents of from 10 to 20% by weight at glass contents greater than 93%, which may be used in the form of mixed cements or as sulphate slag cements free of clinker. The pig iron to be produced by the process according to the invention in terms of specification corresponds to conventional blast furnace pig iron at tendentially slightly lower silicon contents. Advantageously, fine ores in amounts ranging from 200 to 1500 kg/t steel slag are charged, thereby obtaining appropriate Cu and Sn dilutions at accordingly limited offgas volumes and enabling the economic processing of fine ores.

When carrying out the process according to the invention some parameters are of particular relevance with a view to the processability and handling of the slags. Thus, it applies, in particular, that, if slags usually having basicities of about 3 in the case of steel slags, are introduced into a converter containing a metal bath, the target value of 1 to 1.8 and, preferably, about 1.5 is to be adjusted by introducing acidic $SiO_2$ carriers. Such an alteration of the slag basicity naturally must be controlled by the lining of the converter without drastically reducing its service life while simultaneously taking into account that the slag viscosity may be substantially changed by lowering the slag basicity. Due to the decreasing basicity, the slag will be molten at lower temperatures, which in turn affects the handling of the slags such that it may appear particularly advantageous to lower the basicity of the slag to the desired extent either in steps or already prior to its introduction into the converter. While the blowing in of fine ores might thus principally be effected also via bottom tuyeres and through the metal bath, it is more advantageous—bearing in mind the above considerations— to melt open acidic components such as, for instance, fine ores, metallurgical sands or foundry sands already previously and mix them with the steel slag in a separate ladle. According to a preferred further development of the process according to the invention, the latter, therefore, is realized in a manner that the slag basicity of the steel slag is lowered in a ladle preceding the converter containing the metal bath.

In order to be able to effect the mixing of acidic additives and, in particular, $SiO_2$ carriers with the the steel slags in a particularly efficient manner, it is advantageous to largely preheat or even melt those products. Further heating takes place during mixing due to the neutralization reaction, anyway, yet such heating may be used, in particular, in order to do without an additional heating and, in particular, an electric heating in the preceding ladle. Advantageously, the process according to the invention, therefore, is carried out such that the $SiO_2$ carriers required for lowering the basicity such as, e.g., foundry sands, metallurgical sands and/or fine ores are heated in a melting cyclone by the converter offgases while simultaneously purifying the same. The use of a melting cyclone not only has the advantage that the sensible heat of the converter of fgases can be efficiently used, but, at the same time, offers the advantage that the converter offgases can be subjected to effective purification, the purified offgases leaving the melting cyclone thus being able to be conducted directly through heat exchangers or regenerative heat exchangers. As in correspondence with a further preferred embodiment, the Co content, and optionally the $H_2$ content, of the converter off-gases may additionally be burnt in such a melting cyclone, thus also using the chemical heat completely.

In order to ensure that the $SiO_2$ carriers and, in particular, foundry sands or metallurgical sands introduced are melted at the temperatures to be attained in the melting cyclone, iron oxide carriers such as, for instance, fine ores may advantageously be added. On the whole, also fine ores having the appropriate chemical compositions may be charged as sole $SiO_2$ carriers. Advantageously, the process according to the invention is carried out in a manner that the melting cyclone containing the $SiO_2$ carriers is supplemented with fine ores or $Fe_xO_y$ carriers so as to form fayalitic slags and the formed melt is mixed with the slag melt prior to charging into the converter. Unlike quartz sands, which have melting temperatures of about 2000° C., fayalitic slags have melting temperatures of but 1200° to 1250° C., whereby it is ensured that a melt will be obtained with the converter offgas temperature. Such a melt, which efficiently bonds in the dusts of the converter offgases at the same time, subsequently may be rapidly mixed with the steel slag melt in a ladle such that the residence time within the ladle and hence the load on the ladle may be kept low.

Advantageously, also $Al_2O_3$ carriers such as bauxite and/ or metallurgical dusts may be charged into a melting cyclone of that type. In principle, $Al_2O_3$ carriers may, however, be blown directly into the consecutively arranged converter even without considerably stressing the lining, provided they are present in an appropriate form capable of being conveyed pneumatically.

If, within the scope of charging steel slags, precious steel slags are charged, an accordingly high chromium content will have to be taken into account, as a rule. In order to obtain slags that can be charged directly, it must be safeguarded that such a chromium content remains within the metal bath and, therefore, dephosphorization of the metal bath, preferably under reducing conditions, must be effected. To this end, it is advantageously proceeded in a manner that the metal bath of the converter is drawn off and dephosphorized separately under reducing conditions by aid of Cao, $CaC_2$, metallic magnesium, metallic calcium and/or $CaF_2$.

In carrying out the process according to the invention, the following technical parameters are advantageously observed.

Technical Parameters
Submerged Tuyeres (Control Range)

| | |
|---|---|
| Coal | 60–350 kg/$t_{slag}$ |
| Oxygen | 25–100 $Nm^3$/$t_{slag}$ |
| Nitrogen (carrier gas for coal) | 6–9 $Nm^3$/$t_{slag}$ |
| Natural gas (tuyere protection gas for oxygen feed) | 7–10 $Nm^3$/$t_{slag}$ |
| Oxygen and natural gas | 5–8 bars |
| Nitrogen | 7–10 bars |

Hot Blast Lance (Control Range)

| | |
|---|---|
| Pre-pressure hot blast lance | 0.8–1.2 bars |
| Hot blast | 400–1200 $Nm^3$/$t_{slag}$ |

Converter Offgas

| | |
|---|---|
| Temperature | 1650–1750° C. |
| Composition | 50–55% $N_2$ |
| | 7–20% CO |
| | 18–25% $CO_2$ |
| | 0.5–5% $H_2$ |
| | 7–12% $H_2O$ |
| Quantity | 400–1200 $Nm^3$/$t_{slag}$ |

The following materials were used as charging substances for the process according to the invention within the scope of an exemplary embodiment Charging Substances

| Coal (e.g. Zentralkokerei Saar, DIN 23003) | |
|---|---|
| LOI | 19 (%) |
| Ashes | 8 (%) |
| Coal - Ash Analysis (%) | |
| $SiO_2$ | 52 |
| $Al_2O_3$ | 25 |
| $TiO_2$ | 1 |
| $Fe_2O_3$ | 10 |
| CaO | 8 |
| OBM Slag (NMH) (%) | |
| $P_2O_5$ | 1.5 |
| CaO | 48 |
| MnO | 3 |

-continued

| | |
|---|---|
| $Al_2O_3$ | 4 |
| Fe (FeO) | 15 (22) |
| Fe, met | 8 |
| $Cr_2O_3$ | 1 |
| MgO | 3 |
| $SiO_2$ | 15.4 |
| $TiO_2$ | 1 |
| Iron Ore (%) | |
| LOI | 3.2 |
| $SiO_2$ | 2.5 |
| $Al_2O_3$ | 1.5 |
| $P_2O_5$ | 0.1 |
| CaO | 0.1 |
| $Fe_2O_3$ | 92 |
| MgO | 0.03 |
| $SO_3$ | 0.03 |
| Bauxite (%) | |
| $Al_2O_3$ | 95 |
| Sand (%) | |
| $SiO_2$ | 98 |

Steel slags produced in bottom-blowing converters, as a rule, have lower portions of FeO and metallized iron than, for instance, LD or electric furnace slags. The economy of the process according to the invention could be enhanced by adding $SiO_2$ and $Al_2O_3$ additives such as foundry sands, grinding dusts from the automobile industry or from engine manufacturing or the like and by adding iron carriers such as fine ores, converter dusts, mill scales as well as by using optionally dioxin-loaded active coke through the submerged tuyeres. The converter was charged with 580 kg steel works slag, 280 kg iron ore, 60 kg bauxite and 80 kg sand, the converter having been operated with 185 kg coal, 48 $Nm^3$ oxygen and 670 $Nm^3$ hot blast. A yield of 313 kg pig iron and 615 kg of an environmentally safe slag could be obtained.

The tapping temperatures of the produced slag and pig iron were chosen at 1500° C. The initial temperature of the slag was 1400° C.

Fine ore was blown in by means of oxygen submerged tuyeres, thus causing the blown-in iron ore to directly get into contact with the reducing iron bath and hence being metallized. As in contrast to fine ore charging from top using blowing lances, such an iron ore charging through bottom tuyeres has the advantage that the formation of dust is substantially reduced, thus accordingly reducing the respective delivery or emission from the converter.

By being blown into the bath as provided by the invention, fine ore can be metallized at once without having previously dissolved in the slag. In that manner, the service life of the refractory lining is substantially enhanced.

The blowing in of oxygen and carbon or other additives into the bath through separate submerged tuyere systems has proved to be unproblematic, only bivalent iron in the iron ore having not been oxidized if at all. Bauxite, sands and fine ores may be blown in or top-blown together with oxygen. Coal and, in particular, mixtures of equivalent portions of bright-burning coal and anthrazite may be blown through the bath by aid of an inert gas such as, e.g., nitrogen.

Within the scope of the process according to the invention, up to 15 to 30 kg iron ore having grain sizes of smaller than 5 mm/$Nm^3$ oxygen could be conveyed. On the whole, both the required amount of ore and the required amount of bauxite and sand as well as additives may be introduced into the converter by aid of oxygen through the submerged tuyeres within the scope of the process according to the invention. If charging materials difficult to convey pneumatically such as, for instance, additives or ores are to be introduced additionally, this may be effected directly into the converter mouth through the central tube of the hot air lance or via a chute.

BRIEF DESCRIPTION OF THE DRAWINGS

An arrangement particularly preferred for carrying out the process according to the invention is depicted in FIG. 1.

DETAILED DESCRIPTION OF PREFERRED EMBODIMENTS OF THE INVENTION

Figure 1:
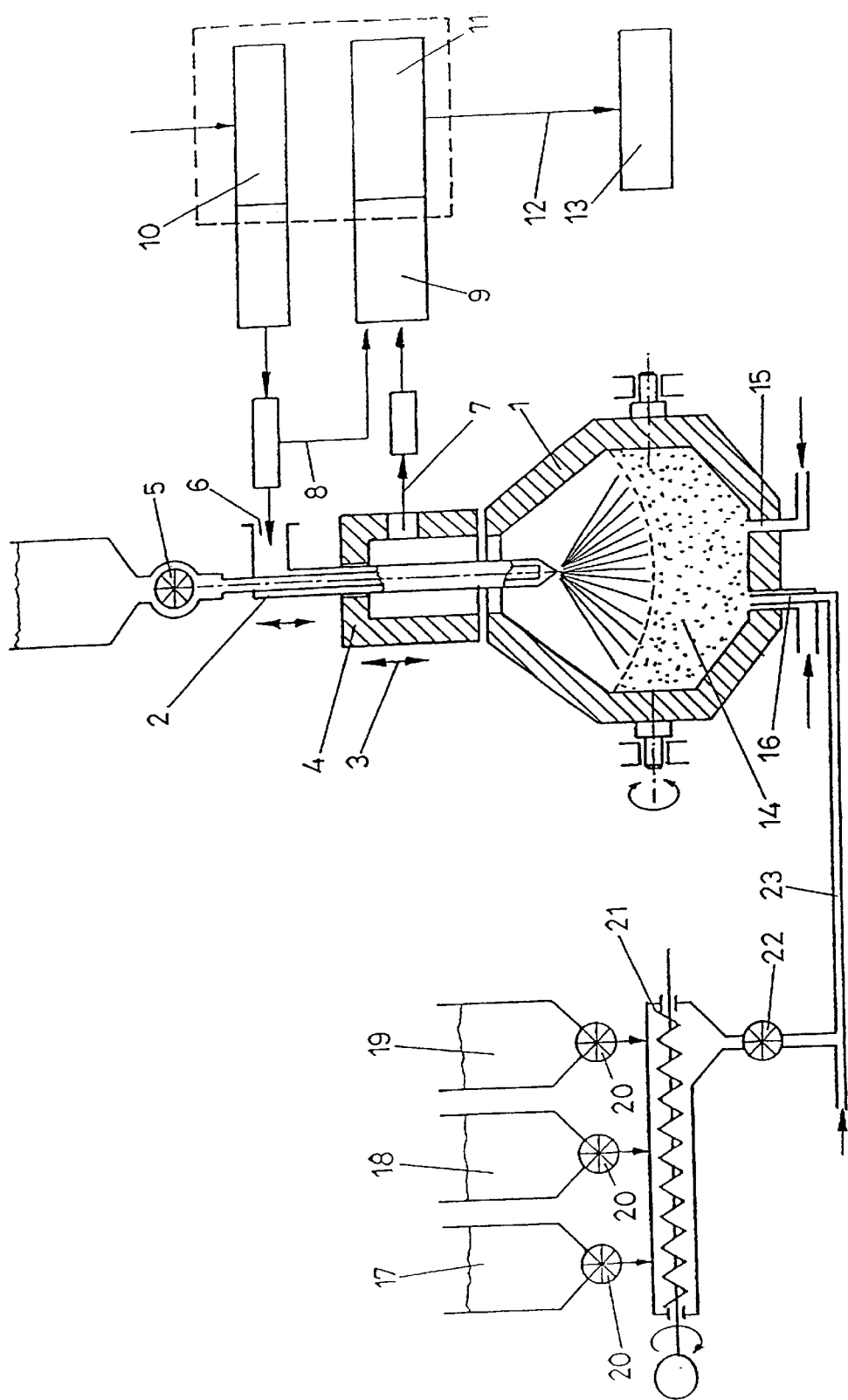

In FIG. 1, a tiltable converter is denoted by 1. A hot air lance 2 passes through a set collar 4, which is adjustable in the vertical direction in the sense of double arrow 3, so as to obtain the appropriate lance position. Relatively inexpensive thermal coal may be charged through the hot air lance via a cellular wheel sluice 5, the hot air being connected to the connection 6 of the lance.

The economy of the process may be enhanced by using suitable heat exchange and heat regeneration procedures. Thus, it is, for instance, possible to withdraw offgas through a duct 7 so as to subject said offgas to afterburning with branched-off hot blast fed to a combustion chamber 9 through a duct 8 together with the offgas. The energy recovered in that manner may be employed for further heating the hot blast. A conventional heat exchanger alternately set in operation is denoted by 10.

The burnt offgas of the combustion chamber 9 drawn off the heat exchanger 11 and cooled with cold air for obtaining hot blast may be supplied to conventional gas treating schematically indicated by 13 through a duct 12 at temperatures of below 200° C.

A slag and iron bath suspension 14 is produced in the interior of the converter 1, metallurgical coal and nitrogen being supplied through bottom tuyeres 15 and additives being fed through oxygen bottom tuyeres 16 optionally enveloped by a protective gas. The additives are composed of $SiO_2$ carriers 17, $Al_2O_3$ carriers 18 and fine ore 19, which may each be fed into a compressed oxygen stream via cellular wheel sluices 20 and a path conveyor 21 as well as a further cellular wheel sluice 22, the pertaining feed line being denoted by 23.

By top-blowing hot blast, an inverse flame is generated in the hot blast jet above the slag and iron bath suspension 14, wherein $SiO_2$ carriers, $Al_2O_3$ carriers or FeO carriers may be additionally charged also via the cellular wheel sluice 5 if they are not readily conveyable pneumatically by aid of the compressed oxygen jet via the bottom tuyeres.

Figure 2:
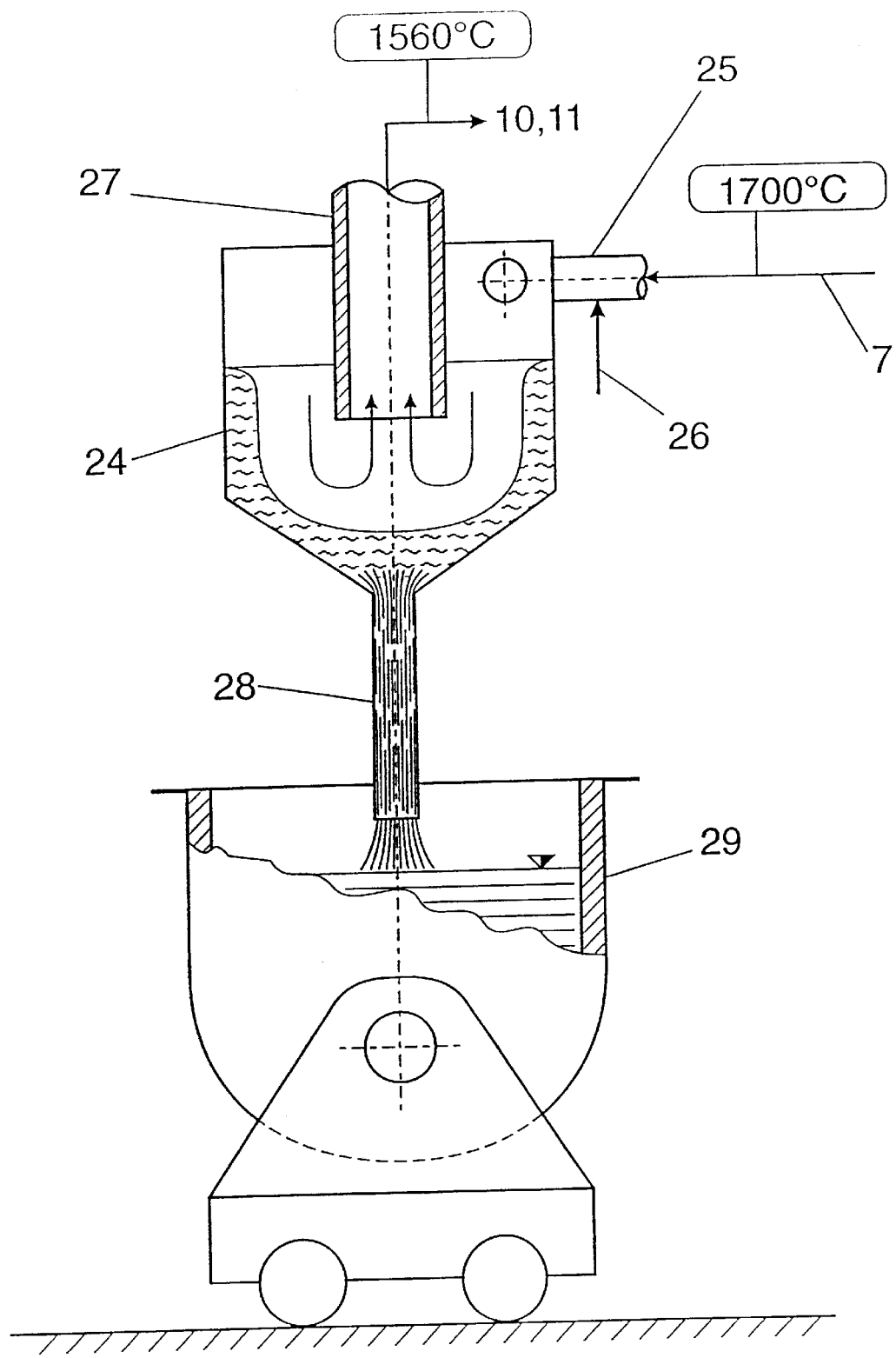
FIG. 2 illustrates a modified arrangement for charging $SiO_2$ carriers.

FIG. 2 depicts a modified configuration of the charging means for acidic fluxes aimed to lower the basicity. A melting cyclone is denoted by 24, to which the hot converter offgases are fed through a duct 25 following upon duct 7 in FIG. 1. The hot converter offgases enter the melting cyclone 24 in a substantially tangential manner, wherein sands and/or fine ores as well as optionally bauxite are additionally blown into the melting cyclone 24 along with the hot offgases, for instance in a coaxial manner. Oxygen may be blown in through a duct 26 for utilizing the chemical heat of the hot converter offgases in order to burn the remaining burnable components of the hot converter offgases.

The $SiO_2$ carriers are accordingly heated in the melting cyclone 24, wherein a melt will immediately form if the $SiO_2$ carriers are comprised of fine ores or iron oxide carriers are charged together with metallurgical or foundry sands. The purified hot converter offgas is drawn off the melting cyclone 24 via a substantially axial duct 27. Since those offgases are then free of dust, they may be directly fed to a heat exchanger.

The melt formed within the melting cyclone 24, through a tube 28, which may be designed, for instance, as a barometric immersion tube, may be transferred into a slag ladle 29 containing liquid steel works slag. During the reaction of the acidic melt with the basic steel slag, additional neutralization heat is released while simultaneously lowering the melting point such that a highly liquid slag capable of being readily charged into the consecutively arranged converter is formed.

A slag having the following slag analysis was produced within the scope of an exemplary embodiment:

| Slag analysis | |
|---|---|
| Component | Portion (%) |
| FeO | 0.576 |
| MnO | 0.019 |
| $SiO_2$ | 33.173 |
| $Al_2O_3$ | 14.943 |
| $TiO_2$ | 1 |
| CaO | 43.317 |
| $Na_2O$ | 0.13 |
| $K_2O$ | 0.042 |
| MgO | 3.14 |
| $SO_2$ | 0.418 |

The liquid product was granulated and ground.

As is apparent from the schematic arrangement for carrying out the process according to the invention, which is illustrated in FIG. 1, the net thermal yield may be further increased by the bypass 8 hot air jet between the hot and cold heat exchangers 10 and 11 or regenerator, respectively. About 15% of the hot blast stream may be fed to the respectively cold heat exchanger while burning the offgas coming from the converter and containing residual amounts of CO and $H_2$. The extra sensible heat is returned to the hot blast via the heat exchangers, after-afterburning advantageously being feasible in steps. Thus, combustion chambers may periodically alternate with heat reservoirs along the offgas stream. In that manner, high temperature peaks or surface heat fluxes can be avoided in the heat exchanger.

In another exemplary embodiment charging substances having the following compositiond were used:

| Steel Slag | |
|---|---|
| Component | Portion (%) |
| Fe | 8 |
| FeO | 17.6 |
| $Fe_2O_3$ | 2.2 |
| $SiO_2$ | 14.1 |
| $Cr_2O_3$ | 0.9 |
| $Al_2O_3$ | 3.2 |
| $P_2O_5$ | 1.3 |
| $TiO_2$ | 1 |
| CaO | 44.3 |
| $Na_2O$ | 0.1 |
| $K_2O$ | 0.03 |

-continued

| Steel Slag | |
|---|---|
| Component | Portion (%) |
| MgO | 3.5 |

| Lean Ore | |
|---|---|
| Component | Portion (%) |
| $SO_3$ | 0.05 |
| $H_2O$ | 3.3 |
| $SiO_2$ | 5.4 |
| $Al_2O_3$ | 3 |
| $P_2O_5$ | 0.3 |
| $Fe_2O_3$ | 82.8 |
| MnO | 0.1 |
| CaO | 0.2 |
| MgO | 0.1 |

Using the above-described lean ore, a slag having the following composition

| Slag (1500° C.) | |
|---|---|
| Component | Portion (%) |
| FeO | 2.6 |
| MnO | 0.3 |
| $SiO_2$ | 32.3 |
| $Cr_2O_3$ | 0.05 |
| $Al_3O_3$ | 12.5 |
| $P_2O_5$ | 0.09 |
| $TiO_2$ | 0.74 |
| CaO | 32.3 |
| $Na_2O$ | 0.14 |
| $K_2O$ | 0.07 |
| MgO | 2.6 |
| $SO_3$ | 0.9 |
| $CaO/SiO_2$ | 1 | and a basicity $CaO/SiO_2$ of about 1 was produced as the target slag. At the same time, a pig iron having the following analysis

| Iron (1500° C.) | |
|---|---|
| Component | Portion (%) |
| C | 4.5 |
| Mn | 0.2 |
| Cr | 0.16 |
| P | 0.27 |
| S | 0.08 |
| Fe | balance | was formed. In order to attain the required basicity, one part of steel slag was mixed with approximately four parts of the above-identified lean ore, the lean ore previously having been melted in a melting cyclone. The desired $Al_2O_3$ content was adjusted by blowing bauxite into the converter.

As mentioned above, the amount of lean ores may be reduced by using additional $SiO_2$ carriers such as, for instance sand, the addition of fine ores to $SiO_2$ sands drastically lowering the melting range due to the formation of fayalite. In order to lower the melting point of $SiO_2$ sands from about 2000° C. to about 1200° C. by the formation of a fayalite slag, the addition of approximately 20% by weight of iron oxide to pure sand ($SiO_2$) will do, in principle.

The melting heat required in the melting cyclone occurs due to the relatively high amount of sensible heat contained in the converter offgases at 1700° C. as well as the fact that a relatively high amount of chemical heat (about 20% CO and $H_2$) is still contained in the converter offgases. The introduction and combustion of those converter offgases results in the formation of fayalite slag in the melting cyclone, additional heat being released by the neutralization taking place in the consecutively arranged steel ladle. That amount of heat, which is not insignificant, causes the optimum liquefaction and homogenization of the mixed slag formed. At the same time, the dust portion of the converter offgas containing a high amount of dust is bonded into the melt, the converter offgas thus being dedusted. Preheating of, for instance, hot blast for the converter may be effected by means of the residual heat via an appropriate heat exchanger.

What is claimed is:

1. A process for working up steel slags and iron carriers comprising at least one member selected from the group consisting of electric furnace slags, converter slags, fine ores, dusts from steel production, mill scales for obtaining pig iron and environmentally safe slags, comprising
    forming a slag and iron bath suspension by thorough mixing of molten slag with an iron bath,
    wherein the volume ratio of molten slag to iron bath is chosen to be larger than 0.5 to 1,
    adding to the slag and iron bath suspension $SiO_2$ carriers comprising at least one member selected from the group consisting of foundry sands, metallurgical sands and fine ores so as to adjust a slag basicity of between 1.0 and 1.8 at an $Al_{2O3}$ content of between 10 and 25% by weight, based on the slag,
    top-blowing hot blast,
    blowing through the iron bath coal, optionally along with an inert gas, and, optionally oxygen or hot air is also blown through the iron bath, and
    wherein the process is carried out in a converter with submerged tuyeres.

2. A process according to claim 1, wherein the slag basicity is adjusted to between 1.3 and 1.6.

3. A process according to claim 1 or 2, wherein the height of the iron bath corresponds to at least 20 times the diameter of the submerged tuyeres.

4. A process according to claim 1, wherein the hot blast is blown at a speed between 0.4 and 0.8 Mach.

5. A process according to claim 1, wherein the slags are granulated forming a slag with a glass content of more than 90%.

6. A process according to claim 1, wherein coal in an amount of 60 to 350 kg/t slag along with nitrogen, as a carrier gas, in an amount of 6 to 9 $Nm^3$/t slag as well as oxygen in an amount of 25 to 100 $Nm^3$/t slag, optionally together with hydrocarbons for protecting the converter tuyeres, are passed through the iron bath.

7. A process according to claim 6, wherein the nitrogen is fed in at a pressure of 7 to 10 bars.

8. A process according to claim 1, wherein the hot blast is top-blown through lances located at the top of the converter, under a pressure of 0.8 to 1.2 bars, in amounts of 400 to 1200 Nm3/t slag.

9. A process according to claim 1, wherein the process is controlled to limit the temperature of offgas from the converter to 1600 to 1800° C.

10. A process according to claim 1, wherein fine ores in amounts ranging from 200 to 1500 kg/t steel slag are charged into the iron bath.

11. A process according to claim 1, wherein the slag basicity of the steel slag is decreased prior to addition of the steel slag to the converter containing the iron bath, and wherein the decrease in slag basicity occurs in a ladle.

12. A process according to claim 1, wherein the $SiO_2$ carriers are simultaneously heated and purified in a melting cyclone, wherein the melting cyclone is heated by offgases supplied from the converter, and wherein the offgases comprise CO.

13. A process according to claim 12, wherein the melting cyclone containing the $SiO_2$ carriers is supplemented with fine ores and/or $Fe_xO_y$ carriers so as to form fayalitic slag, and wherein the fayalitic slag is mixed with the steel slag in a ladle prior to charging into the converter.

14. A process according to claim 12, wherein the CO content of the converter offgases is burnt in the melting cyclone.

15. A process according to claim 12, wherein $Al_2O_3$ carriers are charged into the melting cyclone.

16. A process according to claim 1, wherein the metal bath of the converter is drawn off and dephosphorized separately under reducing conditions by addition of at least one member selected from the group consisting of CaO, $CaC_2$, metallic magnesium, metallic calcium and $CaF_2$.

17. A process according to claim 6, wherein the oxygen and hydrocarbons are fed in at a pressure ranging from 5 to 10 bars.

* * * * *